United States Patent [19]

Powers

[11] 4,190,263

[45] Feb. 26, 1980

[54] WHEELCHAIR WITH SHOCK ABSORBER

[75] Inventor: Samuel T. Powers, Albuquerque, N. Mex.

[73] Assignee: Albuquerque Patents, Ltd., Albuquerque, N. Mex.

[21] Appl. No.: 908,245

[22] Filed: May 22, 1978

[51] Int. Cl.$^2$ .............................................. B62M 1/14

[52] U.S. Cl. .......................... 280/242 WC; 267/20 A; 280/701; 280/286; 280/724; 297/DIG. 4

[58] Field of Search ............... 280/242 WC, 289 WC, 280/701, 690, 725, 726, 285, 286, 724; 297/DIG. 4; 267/20 A

[56] References Cited

U.S. PATENT DOCUMENTS

| | | | |
|---|---|---|---|
| 1,123,872 | 1/1915 | Hazelton | 297/DIG. 4 |
| 3,282,605 | 11/1966 | Nihlean | 297/DIG. 4 |
| 3,917,312 | 11/1975 | Rodaway | 280/242 WC |
| 4,078,817 | 3/1978 | Ferguson | 280/242 WC |

FOREIGN PATENT DOCUMENTS

| | | | |
|---|---|---|---|
| 532170 | 1/1922 | France | 280/286 |

*Primary Examiner*—John P. Silverstrim

*Attorney, Agent, or Firm*—Clarence A. O'Brien; Harvey B. Jacobson

[57] ABSTRACT

The invention consists of a device which can be mounted on a conventional wheelchair to provide shock absorbing qualities to the wheelchair. Each wheel on the wheelchair is removed from its standard mounting position with a shock absorbing device of this invention being used to mount each wheel in a new position spaced longitudinally from its standard position. The device of the invention has a lever with one hole in front which is attached to the axle of the wheelchair by means of a bolt which passes through the hole in the axle and a nut attached to the end of the bolt. Another hole is located centrally in the lever for mounting of the wheel by means of a second bolt and a second nut. At the opposite end of the lever a hole is provided through which a spring is attached. The opposite end of the spring is attached to a rigid member of the wheelchair. In this manner, the weight of the chair and its occupant is supported by the spring tension of the spring. When the wheel of the chair hits a bump, the spring may flex, thus absorbing the shock.

7 Claims, 4 Drawing Figures

WHEELCHAIR WITH SHOCK ABSORBER

BACKGROUND OF THE INVENTION

1. Field of the Invention

This invention relates generally to wheelchairs, and more particularly to wheelchairs which are provided with a shock absorbing means. This device relates even more specifically to devices which can be attached to wheelchairs to provide them with shock absorbers.

2. Description of the Prior Art

Conventional wheelchairs normally include left and right closed frame members connected by diagonally extending crossed tubes arranged scissored together if the chair is of the folding type. Generally, the left and right closed frames include extending back uprights for supporting the chair back and forward upright extending tubes supporting the front of the seat, with the rear and forward uprights being connected by horizontal upper and lower arms to form the left and right structures. Left and right main wheels are rotatably mounted to the rear portion of the closed frames. These wheels are normally firmly attached to the uprights by means of a bolt which passes thrugh the wheel and through a wheelchair axle which is unitary with the wheelchair upright.

This construction works well for wheelchairs which are used in areas having flat floors. However, due to the fact that the wheels are firmly attached to the uprights of the wheelchair, no shock absorbing properties are imparted to the entire device. When traversing ground having uneven terrain in such a wheelchair, many difficulties arise. The ride experienced is at best uncomfortable and at worst can be dangerous since one of the wheels of the chair may actually leave the ground due to contact with bumps or small gullies. This situation may result in toppling of the wheelchair.

Known types of wheelchair suspension systems as exemplified by U.S. Pat. No. 3,917,312 to Rodaway are incorporated in the wheelchairs at the time of manufacture. While these suspension systems are reasonably effective, they provide no means to aid the person who owns a wheelchair which is purchased without such a system, unless he goes to the expense of purchasing an entire new wheelchair. These systems are also rather complex and add greatly to the cost of manufacture of the wheelchair.

SUMMARY OF THE INVENTION

The present invention contemplates a wheelchair shock absorbing device which can added to the rear wheels of an existing wheelchair. The device can be added to the wheelchair after the wheelchair is purchased if the user finds that he desires a smoother ride.

Another object of the invention is to provide a wheelchair shock absorbing device which can be easily and inexpensively manufactured, yet is durable and provides a high shock absorbing capability.

A still further object of the invention is to provide a shock absorbing device for wheelchairs which can be easily added to the frame of an existing wheelchair by use of simple household tools. No skill or prior training is needed to add the device onto an existing wheelchair.

A further object of the device is to provide a wheelchair shock absorbing unit which consists of two main parts. A lever and a spring-type absorber portion. The lever portion can be conveniently attached to the existing axle of the wheelchair. The wheel itself can then be attached to the middle of the lever portion. The spring can then be attached to the opposite end of the lever and to a rigid member on the wheelchair itself. This configuration provides the user with an absorber configuration which has a minimum of parts and relative simplicity of operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Figure 1:
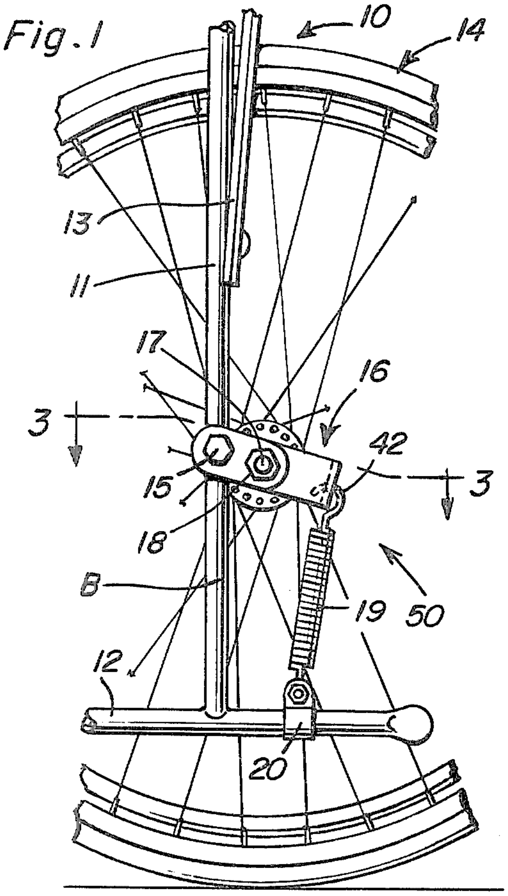
FIG. 1 is an elevational view of the invention.

Referring to FIG. 1, the essential portions of the invention can clearly be distinguished. Portions of a conventional wheelchair are generally referred to as numeral 10. This conventional wheelchair includes an essentially upright rear frame member 11. This frame member 11 is solidly attached to an essentially horizontal frame member 12. Frame member 12 serves to connect rear vertical frame member 11 with a forward vertical frame member (not shown). A rear scissor-like cross member 13 is normally provided on such a wheelchair. Cross member 13 connects vertical frame member 11 which forms a part of the right frame member of the wheelchair with an identical vertical frame member (not shown) which forms the left part of the wheelchair. Cross member 13 is part of a scissor-like action which allows the wheelchair to be folded for ease of transportation when not in use. Wheel 14 is also a part of the conventional wheelchair. This wheel is normally rotatably mounted upon the rear vertical frame member and held in place by a long bolt, such as bolt 17. However, FIG. 1 shows the conventional wheelchair in combination with the absorbing mechanism, generally referred to an numeral 50, and therefore, wheel 14 is shown mounted rearward of the rear vertical frame member 11. As can be seen with reference to FIG. 1, with wheel 14 attached to frame member 11 by use of bolt through tubular axle 36, no compensation would be made when the wheel hits bumps or gullies. Any shock felt by the wheel would be transmitted directly through the bolt to vertical frame member 11.

The absorbing mechanism 50 compensates for any shocks felt by the wheelchair wheel. Again referring to FIG. 1, a lever member 16 is shown as being attached to vertical frame member 11 at the point where a conventional wheelchair would have its wheel attached. Lever member 16 is secured by means of bolt 15. Member 16 is provided with pivotal movement about bolt 15. Wheel 14 is now rotatably mounted to lever member 16 in the center portion thereof. This mounting can be effected, for example, by the use of bolt 17 and nut 18 which may be the original axle bolt or any other effective mounting means. FIG. 1 shows lever member 16 and wheel 14 disposed rearwardly of the rear vertical frame member 11, however, the invention need not be constricted to this configuration. It would also be possible, if desired, to have the lever member and wheel disposed forwardly of the vertical frame member. With the mounting as shown, it is clear that the wheel 14 now is capable of vertical movement. The axis of rotation of wheel 14, now defined by bolt 17 is capable of rotating about bolt 15, thus providing this vertical motion. On the opposite end of lever member 16, a shock absorber device, as for example a spring, 19 is provided. While one end of shock absorber device 19 is attached to lever member 16, the opposite end is attached, for example, by means of clamp 20 to horizontal frame member 12. While clamp 20 is shown as being attached to horizontal frame member 12, it should be noted that this clamp could also possibly be attached to any other rigid frame member which exists below bolt 15, for example, clamp 20 could be attached to the lower portion of vertical frame member 11.

Figure 2:
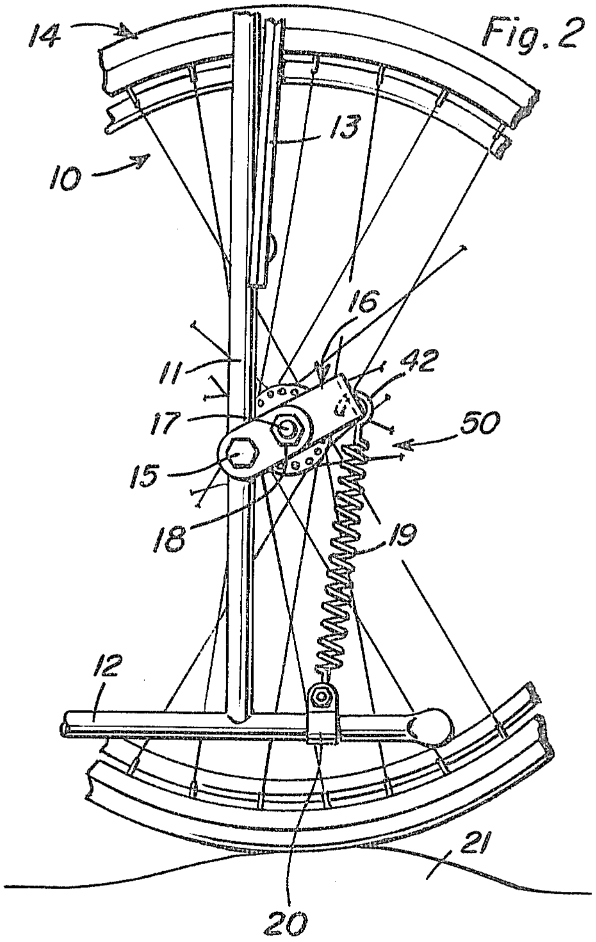
FIG. 2 is an elevational view of the invention shown while absorbing a shock.

In the configuration just described, it is evident that the weight of the wheelchair and its occupant is transmitted to wheel 14 through bolt 15 and spring 19. The spring constant of spring 19 should be such that the spring remains in a compressed state when the wheelchair is empty. when an occupant is in the wheelchair, spring 19 will preferable be elongated slightly. When travelling along uneven surface, wheel 14 may come into contact with a bump shown in FIG. 2 as 21. When this event occurs, wheel 14 will be forced upward of its normal position and spring 19 will be extended, thus absorbing the shock of the bump. Naturally if a gully is encountered, the opposite action will occur and spring 19 will compress to absorb the shock of the gully. This shock absorbing will serve to maintain the frames 11 and 12 more constant with respect to the ground and thus give the occupant a smoother ride.

Figure 3:
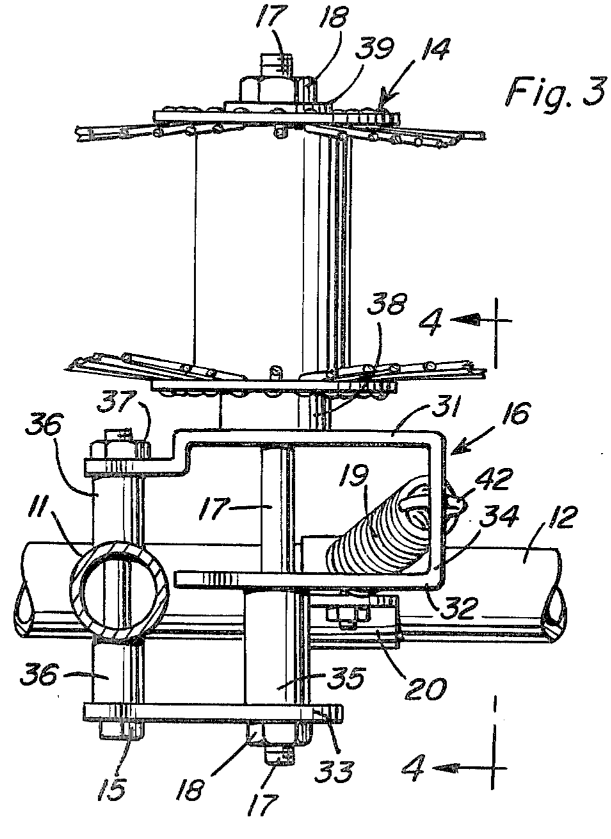
FIG. 3 is a part sectional view of the device taken substantially upon a plane passing along section line 3—3 of FIG. 1.
Figure 4:
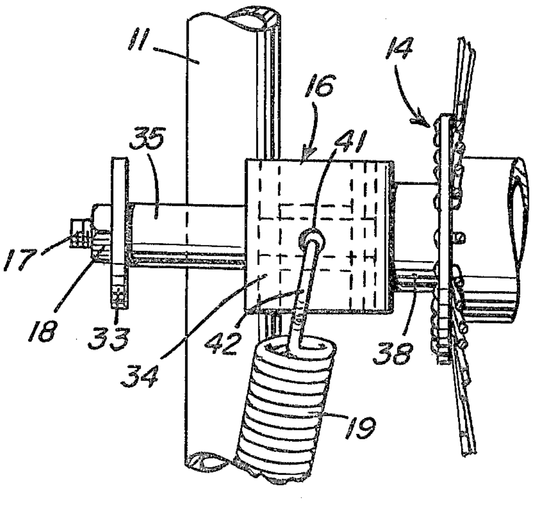
FIG. 4 is an elevational view of the device taken substantially upon a plane passing along section line 4—4 of FIG. 3.

FIGS. 3 and 4 show in more detail the lever member 16 and its connection with vertical frame member 11, wheel 14 and spring 19. As clearly shown in FIG. 3, lever member 16 is composed of three longitudinally extending sections. Sectin 31 extends for the entire length of the lever. Section 32 extends from essentially the middle of the lever to the end of the lever. Section 33 extends from the front of the lever to essentially the middle of the lever. Sections 31 and 32 are connected by a transverse member 34. Section 32 and section 33 are connected by means of a tubular section 35. The entire lever member is made of a solid material such as, for example, steel. The lever member is of unitary construction with the sections thereof firmly secured together by means of, for example, welding. Lever member 16 is attached to the existing wheelchair axle 36 by means of bolt 15 which passes through a hole disposed in section 33, axle 36, and a hole disposed in section 31. Nut 37 is securely fastened to the opposite end of bolt 15. Wheel 14 is attached to lever member 16 by bolt 17 which passes through a hole in member 33, tubular shaft 35, a hole in member 32, a hole in member 31 and hub 38 of wheel 14. Bolt 17 is secured by washer 39 and nut 18.

FIG. 4 shows more specifically the method used to attach spring 19 to lever member 16. A small hole 41 drilled longitudinally in lever member 16 through member 34 thereof provides an attachment position for spring 19. Spring 19 includes on one end thereof a hook portion 42. This hook extends through hole 41 and securely holds spring shock absorber 19 in position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination, a wheelchair and shock absorber, comprising: a rigid frame having a vertical frame member with an axle mounted thereon, a horizontal frame member attached to the lower portion of said vertical frame member; and wherein said shock absorber includes a lever member with one end of said lever member pivotally mounted on said axle, and wherein said wheel is rotatably mounted on said lever member at a point which is longitudinally spaced from the end of said lever member which is mounted on said axle, and a shock absorbing means which has one end attached to said lever member at a point which is longitudinally spaced from the end of said lever member which is mounted on said axle, the other end of said shock absorbing means being attached to one of said frame members; and further wherein said lever member comprises a first segment which extends for the entire length of said lever member, a second segment laterally spaced from and parallel to said first segment and extending from the center of said lever member to the end of said lever member which is longitudinally opposed to the point of attachment to said axle, and a third segment extending from the point of connection of said lever member to said axle to the middle of said lever member, said first and second segments of said lever member being connected by laterally extending connecting segment, said second and third segments being connected by a hollow tubular segment; and further wherein said lever member is attached to said axle by a bolt which passes laterally through said first segment and said thid segment.

2. The combination of claim 1 wherein said shock absorbing means comprises a spring which has one end attached to said laterally extending connecting segment.

3. The combination of claim 1 wherein said wheel is mounted on said lever member by a bolt which passes through said first segment, said second segment, and said third segment of said lever member.

4. A shock absorbing device for attachment to a wheel chair having a rigid frame and an axle, said shock absorbing device comprising: a lever means having a first attachment means at one end thereof for providing a pivotal engagement to said axle, a second attachment means at the longitudinally opposite end thereof, and a third attachment means located on said lever means between said first attachment means and said second attachment means for mounting said wheel with the axis of said wheel being transverse to the longitudinal extent of said lever means, said lever means comprising first, second and third segments, said first segment extending the entire length of said lever means, said second segment being laterally spaced from and parallel to said first segment and extending from the middle of said lever means to the rear thereof, and said third segment being laterally spaced from and parallel to said first segment and said second segment and extending from the front of the lever means to the middle thereof, said first, second and third segments being firmly attached together to form a unitary construction; and an absorbing means having one end adapted for connection with said second attachment means and the opposite end thereof adapted for connection with said rigid frame.

5. The device of claim 4 wherein said third attachment means includes an elongated member connected to said first segment, said second segment, and said third segment and having a portion extending laterally of said segments for mounting said wheel.

6. The device of claim 5 wherein said first attachment means comprises a pair of aligned holes formed in said first segment and said third segment.

7. The device of claim 6 and further including a laterally extending segment connected between said first segment and said second segment and wherein said second attachment means comprises an aperture formed in said laterally extending segment.

* * * * *